United States Patent
Honma et al.

(10) Patent No.: US 9,568,099 B2
(45) Date of Patent: Feb. 14, 2017

(54) OIL PRESSURE CONTROL DEVICE FOR BELT-TYPE CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Tomoaki Honma, Isehara (JP); Seiichiro Takahashi, Isehara (JP); Akito Suzuki, Tokyo (JP); Masahiro Iriyama, Yokohama (JP)

(73) Assignees: JATCO LTD, Fuji-Shi (JP); NISSAN MOTOR CO., LTD., Tokohama-Shi (JP)

( * ) Notice: Subject to any disclaimer, the term of this patent is extended or adjusted under 35 U.S.C. 154(b) by 0 days.

(21) Appl. No.: 15/021,141

(22) PCT Filed: Oct. 17, 2014

(86) PCT No.: PCT/JP2014/077629
§ 371 (c)(1),
(2) Date: Mar. 10, 2016

(87) PCT Pub. No.: WO2015/060205
PCT Pub. Date: Apr. 30, 2015

(65) Prior Publication Data
US 2016/0223078 A1 Aug. 4, 2016

(30) Foreign Application Priority Data
Oct. 24, 2013 (JP) .................. 2013-220713

(51) Int. Cl.
*F16H 61/662* (2006.01)
*F16H 59/14* (2006.01)

(52) U.S. Cl.
CPC ......... *F16H 61/66272* (2013.01); *F16H 59/14* (2013.01)

(58) Field of Classification Search
None
See application file for complete search history.

(56) References Cited

U.S. PATENT DOCUMENTS 5,189,931 A   3/1993  Suzuki
5,269,203 A   12/1993 Ueda
(Continued)

FOREIGN PATENT DOCUMENTS

JP   03-140664 A   6/1991
JP   04-113067 A   4/1992
(Continued)

*Primary Examiner* — Edwin A Young
(74) *Attorney, Agent, or Firm* — Foley & Lardner LLP

(57) ABSTRACT

There is provided an oil pressure control device for a belt-type continuously variable transmission which includes two pulleys and a belt, wherein each of the two pulleys has a movable sheave which moves by oil pressure supplied to a hydraulic chamber, wherein the oil pressure control device calculates a request torque according to a running state, wherein when calculating the oil pressure which is supplied to the hydraulic chamber of the movable sheave on the basis of the request torque, the oil pressure control device reduces the request torque if the request torque is greater by a predetermined value or more than an actual input torque which is inputted to the belt-type continuously variable transmission. Accordingly, it is possible to provide an oil pressure control device for a belt-type continuously variable transmission with which undesirable vibration can be avoided by means of stable speed-ratio control.

5 Claims, 4 Drawing Sheets

(56) References Cited

U.S. PATENT DOCUMENTS

| | | | | |
|---|---|---|---|---|
| 5,726,353 A | * | 3/1998 | Matsuda | F16H 59/16 |
| | | | | 180/338 |
| 2007/0288151 A1 | * | 12/2007 | Kadono | B60W 50/06 |
| | | | | 701/54 |
| 2012/0322613 A1 | * | 12/2012 | Suzuki | F16H 61/16 |
| | | | | 477/41 |

FOREIGN PATENT DOCUMENTS

| | | |
|---|---|---|
| JP | 2008-267467 A | 11/2008 |
| JP | 2011-001973 A | 1/2011 |

* cited by examiner

OIL PRESSURE CONTROL DEVICE FOR BELT-TYPE CONTINUOUSLY VARIABLE TRANSMISSION

TECHNICAL FIELD

The present invention relates to an oil pressure control device for a belt-type continuously variable transmission, which can continuously vary a speed ratio when transmitting motive power between pulleys by a belt.

BACKGROUND ART

Patent Literature 1 discloses a previously-proposed technique. In this technique, a shift-start delay of a shift control (speed ratio control) for a continuously variable transmission is set at a relatively large value with an identical accelerator opening, in an environment such as highlands in which engine torque is reduced.

In the case that oil pressure which is supplied to a movable sheave of each pulley of a belt-type continuously variable transmission is set based on a request torque, if an actual engine torque is reduced due to the highlands or the like, an excessively high oil pressure relative to an actually inputted torque is supplied to the movable sheave. In this case, when the speed ratio fluctuates due to a disturbance or the like, a vibration occurs in the vehicle regardless of the shift-start delay of the shift control. This new problem was found by the inventors of the present application. It is therefore an object of the present invention to provide an oil pressure control device for a belt-type continuously variable transmission, devised to avoid unnecessary vibration by virtue of a stable speed-ratio control.

CITATION LIST

Patent Literature

Patent Literature 1: Japanese Patent Application Publication No. 2008-267467

SUMMARY OF THE INVENTION

To attain the above-mentioned object, in an oil pressure control device for a belt-type continuously variable transmission according to the present invention, the request torque which is used for calculating an oil pressure that is supplied to a hydraulic chamber of the movable sheave is reduced if the request torque is greater by a predetermined value or more than an actual input torque that is inputted to the belt-type continuously variable transmission.

Accordingly, if the request torque is greater than the actual input torque, excessive oil pressure can be prevented from being applied to the movable sheave by reducing the request torque. Therefore, the vibration due to fluctuation of the speed ratio is removed so that a stable travel can be realized.

DETAILED EXPLANATION OF THE INVENTION

First Embodiment

Figure 1:
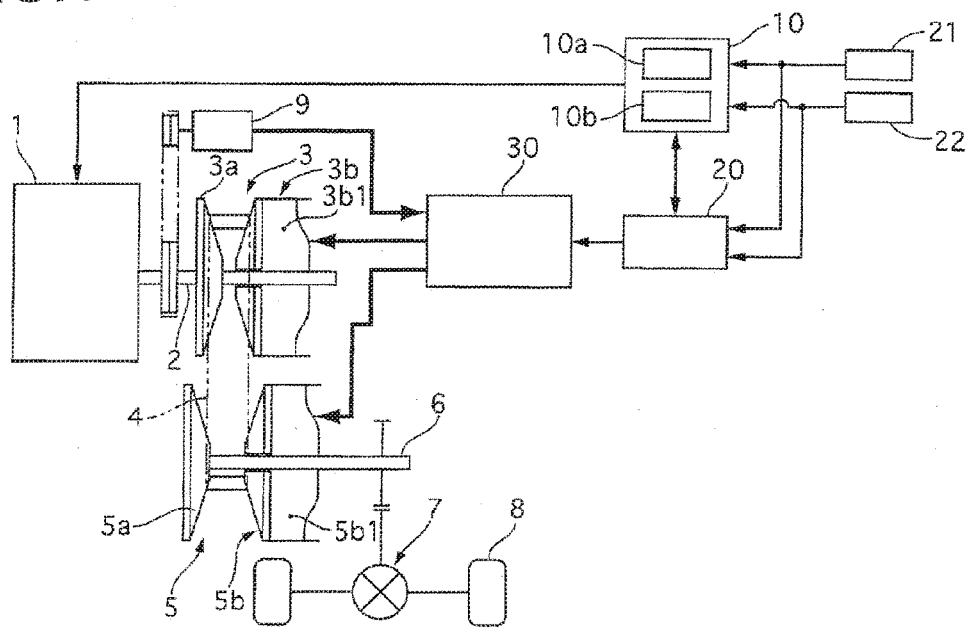
FIG. 1 A system diagram showing an oil pressure control device for a belt-type continuously variable transmission in a first embodiment according to the present invention.

FIG. 1 is a system diagram showing an oil pressure control device for a belt-type continuously variable transmission in a first embodiment according to the present invention. A vehicle in the first embodiment includes an engine 1 and the belt-type continuously variable transmission. The engine 1 is an internal combustion engine. In the vehicle, driving force is transmitted through a differential gear 7 to drive (road) wheels 8. The belt-type continuously variable transmission includes a transmission input shaft 2, a primary pulley 3, a secondary pulley 5 and a belt 4. The transmission input shaft 2 is connected with a crankshaft of the engine 1. The primary pulley 3 rotates integrally with the transmission input shaft 2. The secondary pulley 5 rotates integrally with a transmission output shaft 6. The belt 4 is placed between the primary pulley 3 and the secondary pulley 5 and wound around the primary pulley 3 and the secondary pulley 5 to transmit motive power.

The primary pulley 3 includes a fixed sheave 3a and a movable sheave 3b. The fixed sheave 3a is formed integrally with the transmission input shaft 2. The movable sheave 3b can move on the transmission input shaft 2 in an extending direction of the transmission input shaft 2. The movable sheave 3b is formed with a primary hydraulic chamber 3b1. By oil pressure supplied to the primary hydraulic chamber 3b1, a pressing force is generated between the fixed sheave 3a and the movable sheave 3b so that the belt is sandwiched and held between the fixed sheave 3a and the movable sheave 3b. In the same manner, the secondary pulley 5 includes a fixed sheave 5a and a movable sheave 5b. The fixed sheave 5a is formed integrally with the transmission output shaft 6. The movable sheave 5b can move on the transmission output shaft 6 in an extending direction of the transmission output shaft 6. The movable sheave 5b is formed with a secondary hydraulic chamber 5b1. By oil pressure supplied to the secondary hydraulic chamber 5b1, a pressing force is generated between the fixed sheave 5a and the movable sheave 5b so that the belt is sandwiched and held between the fixed sheave 5a and the movable sheave 5b.

An engine controller 10 controls an engine rotational speed and an engine torque by controlling an operating state (such as a fuel injection quantity and an ignition timing) of the engine 1. In the engine controller 10, a request torque calculating section 10a and an actual engine-torque calculating section 10b are provided. The request torque calculating section 10a calculates a request torque TD of a driver, based on an accelerator opening signal APO detected by an accelerator opening sensor 21 and a vehicle speed signal VSP detected by a vehicle speed sensor 22. Moreover, based on the accelerator opening signal APO and the vehicle speed signal VSP, the actual engine-torque calculating section 10b calculates an actual engine torque TENG that is transmitted to the transmission input shaft 2. A transmission controller 20 calculates a primary oil pressure and a secondary oil pressure in accordance with a running state of the vehicle, and outputs control signals to a control valve unit 30. Details about the transmission controller 20 will be described later. The control valve unit 30 adjusts respective oil pressures on the basis of control signals sent from the transmission controller 20, by using an oil pump 9 as an oil-pressure source. A chain 11 is placed between the oil pump 9 and the transmission input shaft 2, and is wound around the oil pump 9 and the transmission input shaft 2. Through this chain 11, the oil pump 9 is driven by means of driving force of the engine 1. The control valve unit 30 supplies the primary oil pressure and the secondary oil pressure respectively to the primary hydraulic chamber 3*b*1 and the secondary hydraulic chamber 5*b*1 such that a shift control (speed-ratio control) is performed.

Figure 2:
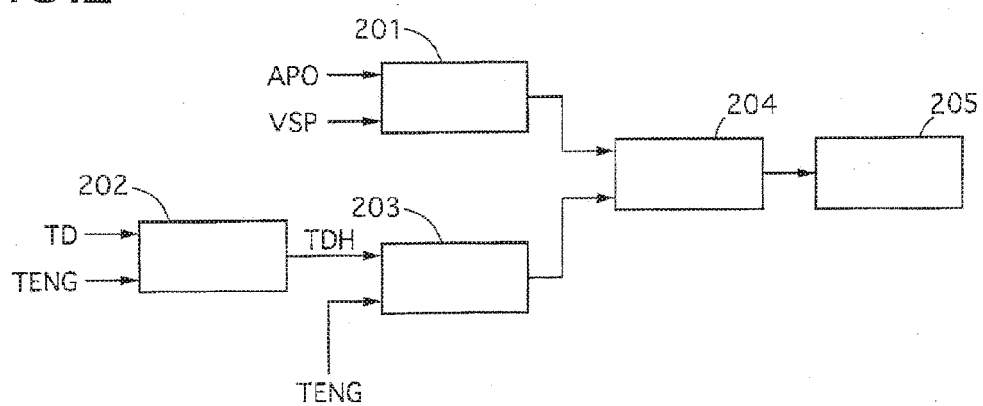
FIG. 2 A control block diagram showing hydraulic control processing which is executed in the first embodiment.

FIG. 2 is a control block diagram showing hydraulic control processing which is executed in the transmission controller 20 in the first embodiment. A target speed-ratio calculating section 201 calculates a target speed ratio (i.e. a target transmission ratio) based on the accelerator opening signal APO derived from the accelerator opening sensor 21 and the vehicle speed signal VSP derived from the vehicle speed sensor 22. The target speed ratio is determined based on a shift characteristic which was preset in order for the engine 1 to attain an optimal fuel economy. A low air-density correcting section 202 calculates a corrected request torque TDH on the basis of values of the actual engine torque TENG and the request torque TD calculated in the engine controller 10. Contents of this correcting processing will be described later. A select-high calculating section 203 selects a higher one between the corrected request torque TDH and the actual engine torque TENG (i.e. the corrected request torque TDH or the actual engine torque TENG, whichever is greater), and outputs the selected larger one. A thrust force calculating section 204 calculates a pulley thrust-force ratio on the basis of the target speed ratio and the torque selected by the select-high calculating section 203, by using a preset map. Then, a pulley hydraulic control section 205 determines the secondary oil pressure on the basis of the torque selected by the select-high calculating section 203, and calculates the primary oil pressure by use of the pulley thrust-force ratio. Then, the pulley hydraulic control section 205 outputs control signals to the control valve unit 30.

(Problem at the Time of Low Air Density)

Figure 3:
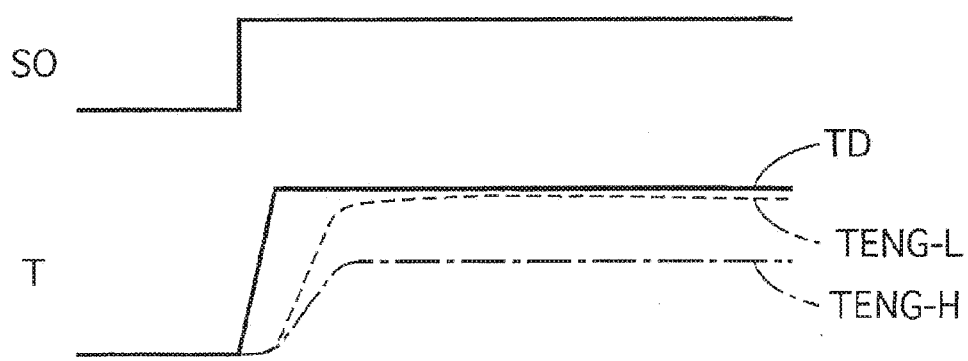
FIG. 3 A time chart showing a relation among a throttle opening and an engine torque in the first embodiment.

FIG. 3 is a time chart showing a relation among a throttle opening of the engine, the request torque of the engine, and the actual engine torque. An upper part of FIG. 3 represents the throttle opening SO whereas a lower part of FIG. 3 represents the engine torques T. When a driver depresses an accelerator pedal, the accelerator opening APO increases with accompanying increase of the throttle opening SO. At this time, the request torque TD indicated by a solid line in the engine torques T of FIG. 3 also increases. Hence, the actual engine torque indicated by a dotted line TENG-L is controlled toward the request torque TD such that the actual engine torque TENG-L is brought closer to the request torque TD. When controlling the engine 1, the ignition timing and the fuel injection quantity relative to an intake air quantity and the like are set so that the engine torque is controlled. A table which is used for performing this control is preset based on a level of air density given for a low altitude (lowlands) which is a common travelling environment. Hence, in the case that the air density is low, e.g. in the case that the vehicle travels on highlands, sufficient air density cannot be secured. In this case, even if a control for outputting the request torque is performed, the actual engine torque which is outputted from the engine is lower than the dotted line TENG-L as indicated by TENG-H.

It is known that the primary oil pressure and the secondary oil pressure are calculated by using higher one of the request torque TD and the actual engine torque TENG as explained for the select-high calculating section 203, when calculating the primary oil pressure and the secondary oil pressure in order to control the speed ratio of a belt-type continuously variable transmission or the like. Reasons are as follows. In the case that the request torque TD is higher than the actual engine torque TENG, torque outputted from the engine 1 is considered to become larger soon, and a hydraulic control based on the request torque TD is considered to be able to bring oil pressure into a desired state beforehand in consideration of a responsibility in engine torque change and a responsibility in hydraulic control. Accordingly, a high controllability can be attained. On the other hand, in the case that the actual engine torque TENG is higher than the request torque TD, a hydraulic control based on the actual engine torque TENG can prevent a belt slip.

In such a control configuration, even if the select-high calculating section 203 selects the request torque TD which takes a high value, there is a possibility that the actual engine torque becomes low when the air density is low because of highland travel. Under this condition that the torque inputted to the transmission input shaft 2 is lower than expected, if the primary oil pressure and the secondary oil pressure are set on the assumption of (expected) high input torque, a vibration occurs in the vehicle at the time of variation of the speed ratio which is caused due to a disturbance or the like. The inventors of the present application found this new problem.

Figure 4:
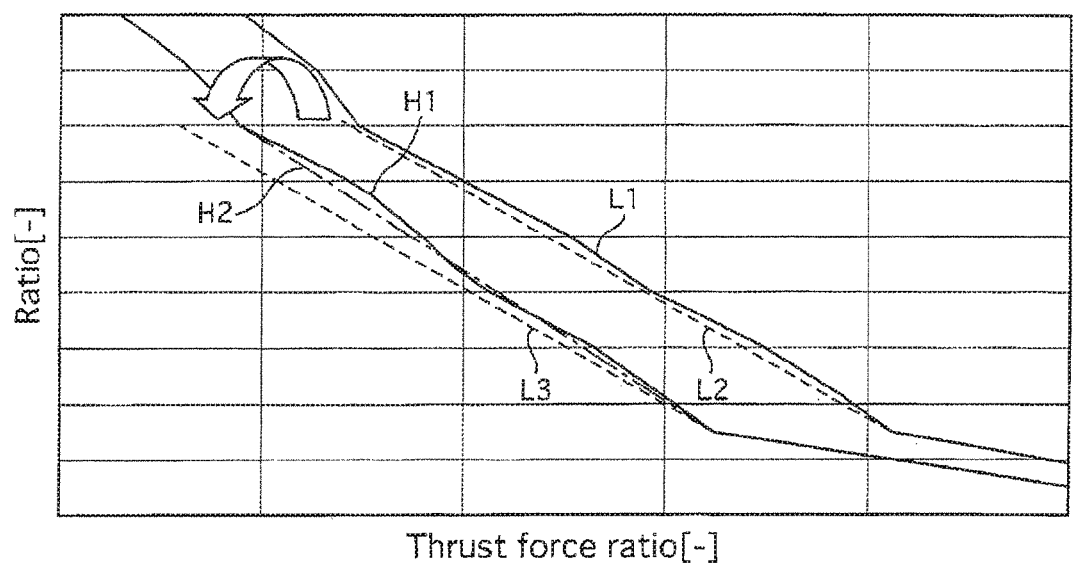
FIG. 4 A characteristic view showing a characteristic of speed ratio with respect to a thrust force ratio in the belt-type continuously variable transmission in the first embodiment.

FIG. 4 is a characteristic view showing a relation between the thrust force ratio (Thrust force ratio) and the speed ratio (Ratio) in the belt-type continuously variable transmission. A right line L1 of FIG. 4 indicates a relation between the thrust force ratio and the speed ratio when travelling on the lowlands. A left line H1 of FIG. 4 indicates a relation between the thrust force ratio and the speed ratio when travelling on the highlands. When the vehicle travels on the lowland, the actual engine torque TENG is sufficiently secured, and a variation gradient of the speed ratio relative to the thrust force ratio is approximately regarded as a straight line shown by a dotted line L2. On the other hand, when the vehicle travels on the highland, the actual engine torque TENG becomes relatively low, and the variation gradient of the speed ratio relative to the thrust force ratio is approximately regarded as a straight line shown by an alternate long-and-short dash line H2. By comparing the alternate long-and-short dash line H2 of the highland travel with a dotted line L3 which is parallel to the dotted line L2 of the lowland travel, the inventors of the present application found that the gradient of the alternate long-and-short dash line H2 tends to be greater than the gradient of the dotted line L3. This means that the speed ratio given when the control is performed by excessive thrust torque such as at the time of highland travel greatly varies with respect to a variation of the thrust force ratio, as compared with the speed ratio given when the control is performed by appropriate thrust force such as at the time of lowland travel. That is, a sensitivity in shift (speed ratio) is too high. Accordingly, when the thrust force is varied by a disturbance or the like, there is a risk that the speed ratio is largely influenced to cause a torque fluctuation transmitted to the drive wheels so that a vibration occurs. Therefore, in the first embodiment according to the present invention, the request torque is corrected to be reduced such that the above-mentioned vibration is avoided if a gap (difference) between the request torque and the actual engine torque becomes large.

Figure 5:
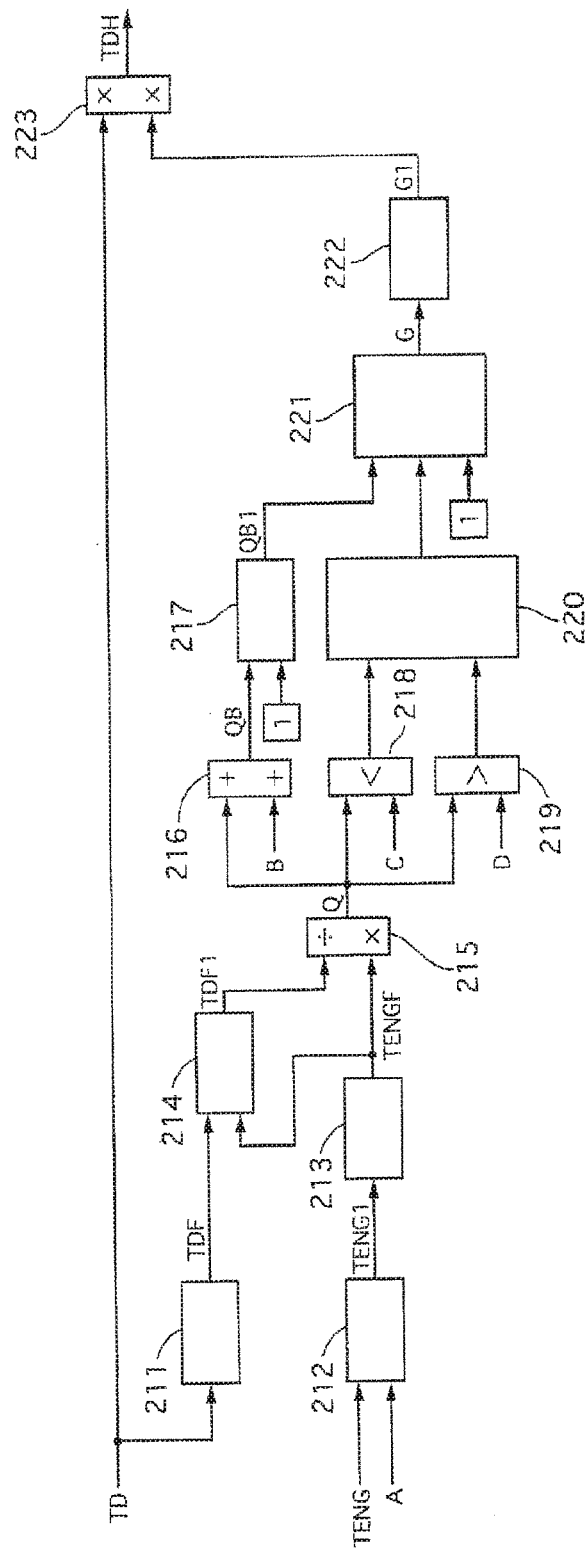
FIG. 5 A control block diagram showing a control configuration of a low air-density correcting section in the first embodiment.

FIG. 5 is a control block diagram showing the correcting processing of the low air-density correcting section 202 in the first embodiment. A first filter 211 applies a filtering process having a first time constant, to the request torque TD inputted to the first filter 211. Then, the first filter 211 outputs a request torque filtered value TDF. A lower-limit processing section 212 selects higher one of the actual engine torque TENG and a lower limit value "A" (i.e. the actual engine torque TENG or the lower limit value "A", whichever is higher). Then, the lower-limit processing section 212 outputs a lower-limit-processed actual engine torque TENG1. By this process, a division-by-zero is prevented in an after-mentioned ratio calculating section 215. A second filter 213 applies a filtering process having a second time constant, to the lower-limit-processed actual engine torque TENG1. The second time constant is shorter than the first time constant. Then, the second filter 213 outputs an actual engine torque filtered value TENGF (corresponding to an actual input torque filtered value). The request torque TD is easy to change rapidly according to intention of a driver, whereas the actual engine torque TENG changes after the request torque TD has changed. Hence, the request torque TD and the actual engine torque TENG have different phases from each other. Therefore, the processes are conducted by using filters having the different time constants (first time constant>second time constant) such that the phase of the request torque TD and the phase of the actual engine torque TENG are balanced. Thereby, an easy-to-compare configuration is attained.

A select-high section 214 selects larger one of the request torque filtered value TDF and the actual engine torque filtered value TENGF (i.e. the request torque filtered value TDF or the actual engine torque filtered value TENGF, whichever is larger). Then, the select-high section 214 outputs the selected value as a corrected request torque filtered value TDF1. The ratio calculating section 215 calculates a ratio Q by dividing the actual engine torque filtered value TENGF by the corrected request torque filtered value TDF1. In the case that the request torque filtered value TDF is larger than the actual engine torque filtered value TENGF, the ratio Q is equal to 1 (Q=1) because the actual engine torque filtered value TENGF is selected as the corrected request torque filtered value TDF1. On the other hand, in the case that the request torque filtered value TDF is smaller than the actual engine torque filtered value TENGF, the ratio Q is smaller than 1.

An offset processing section 216 adds an offset amount B to the ratio Q, and outputs its result as an offset ratio QB. A select-low section 217 outputs smaller one of "1" and the offset ratio QB (i.e. "1" or the offset ratio QB, whichever is smaller) as a corrected ratio QB1. By this process, the corrected request torque TDH is set at a value larger than the actual engine torque TENG by a predetermined amount, so that the primary oil pressure and the secondary oil pressure are set at a relatively high level to secure a belt capacity. Accordingly, even if the actual engine torque TENG fluctuates, the belt slip is prevented so that a stable shift control can be attained.

A flag-set judging section 218 compares the ratio Q with a predetermined value C. In the case that the ratio Q is smaller than the predetermined value C, the flag-set judging section 218 outputs a flag-set request. A flag-clear judging section 219 compares the ratio Q with a predetermined value D (>C). In the case that the ratio Q is larger than the predetermined value D, the flag-clear judging section 219 outputs a flag-clear request. For example, assuming that the predetermined value C is equal to 0.9 (C=0.9) and the predetermined value D is equal to 0.95 (D=0.95), the flag-set request is outputted when the ratio Q becomes lower than 0.9, and then, the flag-clear request is outputted when the ratio Q becomes higher than 0.95. By this process, a hunting due to the flag set is avoided. A flag setting section 220 sets or clears a flag on the basis of outputs of the flag-set judging section 218 and the flag-clear judging section 219. A switching section 221 selects the corrected ratio QB1 from the corrected ratio QB1 and "1", in the case that the flag setting section 220 sets the flag because of the output of the flag-set request. Then, the switching section 221 outputs the selected corrected ratio QB1 as a gain G. On the other hand, the switching section 221 selects "1" in the case that the flag setting section 220 clears the flag because of the output of the flag-clear request. Then, the switching section 221 outputs "1" as the gain G. A variation limiting section 222 limits a variation amount of the gain G, and outputs its result as a limited gain G1. By this process, the request torque TD can be prevented from being rapidly corrected due to a rapid change of the gain. As a result, a stable shift control can be realized. A gain multiplying section 223 multiplies the request torque TD by the limited gain G1, and outputs its result as the corrected request torque TDH.

Figure 6:
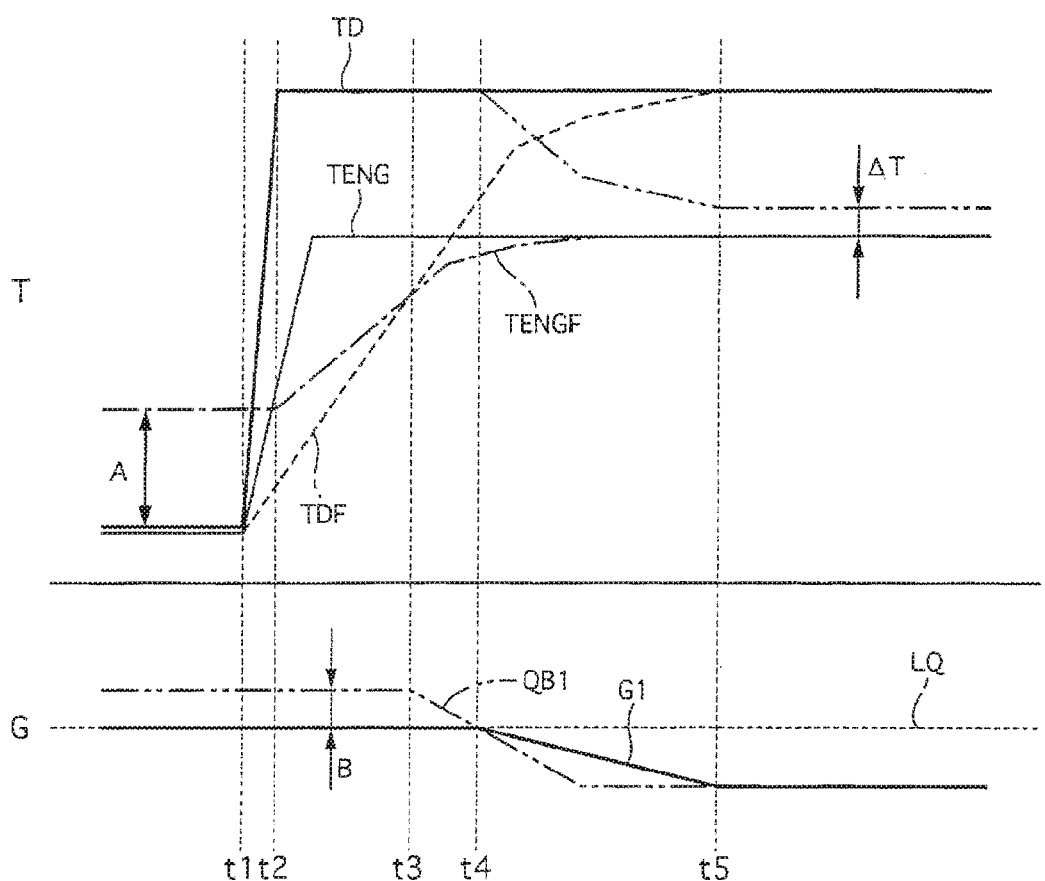
FIG. 6 A time chart showing a situation where a low air-density correcting processing is executed in the first embodiment.

FIG. 6 is a time chart showing a situation where a low air-density correcting processing according to the first embodiment is executed. An upper part of FIG. 6 shows variations of the torques T with respect to elapsed time, whereas a lower part of FIG. 6 shows a variation of the gain G with respect to the elapsed time. At time point t1, a driver depresses the accelerator pedal so that the increase of the request torque TD is started. At the same time, the actual engine torque TENG starts to rise. At this time, the actual engine torque filtered value TENGF takes a constant "A" because the actual engine torque filtered value TENGF is larger than the actual engine torque TENG by the offset amount "A". At this time, even if the filtering process is applied, the constant "A" is outputted as the actual engine torque filtered value TENGF. Moreover, the request torque filtered value TDF takes a smaller value than the actual engine torque filtered value TENGF also because the time constant for the request torque filtered value TDF is relatively long. Hence, the ratio Q is equal to 1 (Q=1), and the offset ratio QB is equal to "1+B". The limited gain G1 is equal to 1 because the judgment of the flag is "clear". At time point t2, the actual engine torque TENG becomes greater than the actual engine torque filtered value TENGF. At this time, the actual engine torque filtered value TENGF starts to rise in retard of the rise start of the actual engine torque TENG.

At time point t3, the request torque filtered value TDF becomes greater than the actual engine torque filtered value TENGF. At this time, the ratio Q starts to become smaller than 1, and the judgment of the flag is made to be "set" so that the offset ratio QB starts to decrease from "1+B". At time point t4, the corrected ratio QB1 becomes lower than 1, and the gain G becomes smaller than 1. At this time, the limited gain G1 starts to decrease gently as compared with a decrease of the corrected ratio QB1 by virtue of the above-mentioned variation-amount limitation. Thus, over a range between time point t1 and time point t4, the limited gain G1 takes a constant value along a dotted line LQ where the ratio Q is equal to 1 (Q=1). At time point t5, the limited gain G1 becomes in a steady state. At this time, the corrected request torque TDH which is larger than the actual engine torque TENG by a torque ΔT is outputted. The torque ΔT corresponds to the offset amount (offset gain) "B". By these operations, the request torque TD can approach the actual engine torque TENG, so that excessive pulley oil pressure can be prevented from being applied. Hence, the problem that the vehicle causes a vibration when the speed ratio fluctuates due to disturbance or the like can be avoided.

As explained above, the following listed configurations and effects are obtained in the first embodiment according to the present invention.

(1) An oil pressure control device for a belt-type continuously variable transmission, wherein the belt-type continuously variable transmission includes two pulleys and a belt 4 provided between the two pulleys and wound around the two pulleys to transmit motive power, and each of the two pulleys has a movable sheave 3b, 5b which moves by oil pressure supplied to a hydraulic chamber, the oil pressure control device comprising: a request torque calculating section (request torque calculating means) 10a that calculates a request torque TD according to a running state; a thrust force calculating section (oil pressure calculating means) 204 that calculates the oil pressure which is supplied to the hydraulic chamber 3b1, 5b1, on the basis of the request torque TD; an actual engine-torque calculating section (actual input-torque calculating means) 10b that calculates an actual engine torque (actual input torque) TENG which is inputted to the belt-type continuously variable transmission; and a low air-density correcting section (correcting means) 202 that corrects the request torque TD such that the request torque TD is reduced if the request torque TD is greater than the actual engine torque TENG by a predetermined value or more. Accordingly, the request torque TD is corrected to be reduced if the request torque TD is greater than the actual engine torque TENG by the predetermined value or more. Hence, the oil pressure which is supplied to the movable sheave 3b, 5b can be prevented from becoming excessive, so that the vibration associated with the fluctuation in speed ratio is removed. Therefore, a stable running of the vehicle can be realized. It is noted that, although the low air-density correcting section 202 which corresponds to the correcting means corrects the request torque TD in a reducing manner in the first embodiment, the correcting means according to the present invention is not limited to the low air-density correcting section 202. The other section may reduce the request torque TD.

(2) A value obtained by applying a filtering process of a first time constant to the request torque TD is defined as a request torque filtered value TDF, a value obtained by applying a filtering process of a second time constant to the actual engine torque TENG is defined as an actual engine torque filtered value TENGF, the second time constant being shorter than the first time constant, and the low air-density correcting section 202 corrects the request torque TD on the basis of a ratio between the request torque filtered value TDF and the actual engine torque filtered value TENGF. That is, the request torque TD tends to change rapidly according to intention of, a driver, whereas the actual engine torque TENG changes after the request torque TD has changed. Hence, the request torque TD and the actual engine torque TENG have different phases from each other. Therefore, the processes are conducted by using filters having the different time constants such that the request torque TD is delayed relative to the actual engine torque TENG. Accordingly, the phases of the request torque TD and the actual engine torque TENG can be equalized and stably compared with each other.

(3) The low air-density correcting section 202 corrects such that the request torque filtered value TDF becomes greater than the actual engine torque filtered value TENGF by a predetermined value or more. In other words, the offset amount "B" is added to the ratio Q. Accordingly, the corrected request torque TDH is set at a value greater than the actual engine torque TENG by a predetermined amount, so that the primary oil pressure and the secondary oil pressure are set at a relatively high level to secure the belt capacity. Accordingly, even if the actual engine torque TENG fluctuates, the belt slip is prevented so that a stable shift control can be realized.

(4) The select-high calculating section 203 (oil pressure calculating means) calculates the oil pressure which is supplied to the hydraulic chamber 3b1, 5b1, on the basis of higher one of the actual engine torque TENG and the corrected request torque TDH. This select-high process is employed in order to compensate a response lag in oil pressure of the transmission. Specifically, the oil pressure can be changed based on the request torque TD before the actual engine torque changes. That is, even if a responsivity of oil pressure is worse, the oil pressure can be increased in advance of a change of the actual engine torque, so that the belt slip can be prevented.

The invention claimed is:

1. An oil pressure control device for a belt-type continuously variable transmission,
wherein the belt-type continuously variable transmission includes two pulleys and a belt provided between the two pulleys and wound around the two pulleys to transmit motive power,
each of the two pulleys has a movable sheave which moves by oil pressure supplied to a hydraulic chamber, and
the oil pressure control device is configured
to calculate a request torque according to a running state,
to calculate the oil pressure which is supplied to the hydraulic chamber, on the basis of the request torque,
to calculate an actual input torque which is inputted to the belt-type continuously variable transmission, and
to reduce the request torque if the request torque is greater than the actual input torque by a predetermined value or more.

2. An oil pressure control device for a belt-type continuously variable transmission,
wherein the belt-type continuously variable transmission includes two pulleys and a belt provided between the two pulleys and wound around the two pulleys to transmit motive power, and
each of the two pulleys has a movable sheave which moves by oil pressure supplied to a hydraulic chamber,
the oil pressure control device comprising:
a request torque calculating section that calculates a request torque according to a running state;
an oil pressure calculating section that calculates the oil pressure which is supplied to the hydraulic chamber, on the basis of the request torque;
an actual input-torque calculating section that calculates an actual input torque which is inputted to the belt-type continuously variable transmission; and
a correcting section that corrects the request torque such that the request torque is reduced if the request torque is greater than the actual input torque by a predetermined value or more.

3. The oil pressure control device according to claim 2, wherein a value obtained by applying a filtering process of a first time constant to the request torque is defined as a request torque filtered value, a value obtained by applying a filtering process of a second time constant to the actual input torque is defined as an actual input torque filtered value, the second time constant being shorter than the first time constant, and the correcting section corrects the request torque on the basis of a ratio between the request torque filtered value and the actual input torque filtered value.

4. The oil pressure control device according to claim 3, wherein the correcting section corrects such that the request torque filtered value becomes greater than the actual input torque filtered value by a predetermined value or more.

5. The oil pressure control device according to claim 2, wherein the oil pressure calculating section calculates the oil pressure which is supplied to the hydraulic chamber, on the basis of higher one of the actual input torque and a corrected request torque corrected by the correcting section.

\* \* \* \* \*